US006432584B1

(12) United States Patent
Visco et al.

(10) Patent No.: US 6,432,584 B1
(45) Date of Patent: *Aug. 13, 2002

(54) METHOD FOR FORMING ENCAPSULATED LITHIUM ELECTRODES HAVING GLASS PROTECTIVE LAYERS

(75) Inventors: Steven J. Visco, Berkeley; Floris Y. Tsang, Walnut Creek, both of CA (US)

(73) Assignee: PolyPlus Battery Company, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/678,063

(22) Filed: Oct. 2, 2000

Related U.S. Application Data

(63) Continuation of application No. 09/139,601, filed on Aug. 25, 1998.
(60) Provisional application No. 60/083,947, filed on May 1, 1998.

(51) Int. Cl.[7] .................................................. H01M 4/08
(52) U.S. Cl. .............................. 429/231.95; 429/218.1; 429/232
(58) Field of Search ....................... 429/231.95, 218.1, 429/232, 246, 248

(56) References Cited

U.S. PATENT DOCUMENTS

| | | | |
|---|---|---|---|
| 4,162,202 A | 7/1979 | Dey | 205/59 |
| 4,981,672 A | 1/1991 | de Neufville et al. | 423/464 |
| 5,100,523 A | 3/1992 | Helms et al. | 428/426 |
| 5,314,765 A | 5/1994 | Bates | 429/194 |
| 5,338,625 A | 8/1994 | Bates et al. | 429/193 |
| 5,342,710 A | 8/1994 | Koksbang | 429/192 |
| 5,409,786 A | 4/1995 | Bailey | 429/52 |
| 5,455,126 A | 10/1995 | Bates et al. | 429/127 |
| 5,512,147 A | 4/1996 | Bates et al. | 204/192.15 |
| 5,567,210 A | 10/1996 | Bates et al. | 29/623.5 |
| 5,569,520 A | 10/1996 | Bates | 429/162 |
| 5,597,660 A | 1/1997 | Bates et al. | 429/191 |
| 5,612,152 A | 3/1997 | Bates et al. | 429/152 |
| 5,648,187 A | 7/1997 | Skotheim | |
| 5,696,201 A | 12/1997 | Cavalloni et al. | 524/594 |
| 6,025,094 A * | 2/2000 | Visco et al. | 429/231.95 |
| 6,214,061 B1 * | 4/2001 | Visco et al. | 29/623.5 |

FOREIGN PATENT DOCUMENTS

| | | | |
|---|---|---|---|
| EP | 0111213 A2 | 11/1983 | H01M/4/06 |
| EP | 0 111 214 | 6/1984 | H01M/4/06 |
| EP | 0875951 A1 | 11/1998 | H01M/4/02 |
| EP | 0689260 B1 | 4/1999 | H01M/10/40 |

OTHER PUBLICATIONS

Nippon Telegr & Teleph Corp., "Patent Abstracts of Japan," vol. 008, No. 119 (E–248), Jun. 5, 1984 & JP 59 031573 A, Feb. 20, 1984.
Steven D. Jones, et al., "Thin film rechargeable Li batteries", 1994, *Solid State Ionics* no month.
"R&D Thin–Film Technology," Sep., 1997, *R& D Magazine*.
Steven D. Jones, et al., "Thin Film Rechargeable Li Batteries," Ohio/New Jersey, 1994, *Solid States Ionics* no month.
J.B. Bates, et al., "Thin–Film Rechargeable Lithium Batteries," Tennessee, *Journal of Power Sources*, Mar. 1995, vol. 54 pp 58–62.

(List continued on next page.)

Primary Examiner—Carol Chaney
(74) Attorney, Agent, or Firm—Beyer Weaver & Thomas LLP

(57) ABSTRACT

A method for fabricating an active metal electrode involves depositing lithium or other active metal electrode on a protective layer. The protective layer is a glassy or amorphous material that conducts ions of the active metal. It may be deposited on a releasable web carrier or other substrate such as polymer electrolyte layer. Lithium is then deposited on the protective layer. Finally, a current collector is attached to the lithium.

16 Claims, 4 Drawing Sheets

OTHER PUBLICATIONS

N.J. Dudney, et al., "Sputtering of Lithium Compounds for Preparation of Electrolyte Thin Films," 1992, Tennessee, *Solid State Ionics*.

J.B. Bates, et al., "Electrical Properties of Amorphous Lithium Electrolyte Thin Films," 1992, Tennessee, *Solid State Ionics* no month.

Xiaohua Yu, et al., "A Stable Thin–Film Lithium Electrolyte: Lithium Phosphorus Oxynitride," Feb. 1997, Tennessee, *The Electrochemical Society, Inc.*.

Nippon Telegr & Teleph Corp., "Patent Abstracts of Japan," vol. 008, No. 119 (E–248), Jun. 5, 1984 & JP 59 031573 A, Feb. 20, 1984.

* cited by examiner

METHOD FOR FORMING ENCAPSULATED LITHIUM ELECTRODES HAVING GLASS PROTECTIVE LAYERS

CROSS-REFERENCE TO RELATED APPLICATIONS

This application is a continuation of Ser. No. 09/139,601 filed Aug. 25, 1998 which claims benefit of No. 60/083,947 filed May 1, 1998.

This application is related to U.S. patent application Ser. No. 09/139 603 filed on the same day as the instant patent application, titled "PLATING METAL NEGATIVE ELECTRODES UNDER PROTECTIVE COATINGS," and naming May-Ying Chu, Steven J. Visco and Lutgard C. DeJonghe as inventors. This application is also related to U.S. patent application Ser. No. 09/086,665. Both of these patent applications are incorporated herein by reference for all purposes.

BACKGROUND OF THE INVENTION

This invention relates to negative electrodes for use in batteries (e.g., lithium electrodes for use in lithium-sulfur batteries). More particularly, this invention relates to methods of forming alkali metal electrodes having a thin glassy or amorphous protective layer.

In theory, some alkali metal electrodes could provide very high energy density batteries. The low equivalent weight of lithium renders it particularly attractive as a battery electrode component. Lithium provides greater energy per volume than the traditional battery standards, nickel and cadmium. Unfortunately, no rechargeable lithium metal batteries have yet succeeded in the market place.

The failure of rechargeable lithium metal batteries is largely due to cell cycling problems. On repeated charge and discharge cycles, lithium "dendrites" gradually grow out from the lithium metal electrode, through the electrolyte, and ultimately contact the positive electrode. This causes an internal short circuit in the battery, rendering the battery unusable after a relatively few cycles. While cycling, lithium electrodes may also grow "mossy" deposits which can dislodge from the negative electrode and thereby reduce the battery's capacity.

To address lithium's poor cycling behavior in liquid electrolyte systems, some researchers have proposed coating the electrolyte facing side of the lithium negative electrode with a "protective layer." Such protective layer must conduct lithium ions, but at the same time prevent contact between the lithium electrode surface and the bulk electrolyte. Many techniques for applying protective layers have not succeeded.

Some contemplated lithium metal protective layers are formed in situ by reaction between lithium metal and compounds in the cell's electrolyte which contact the lithium. Most of these in situ films are grown by a controlled chemical reaction after the battery is assembled. Generally, such films have a porous morphology allowing some electrolyte to penetrate to the bare lithium metal surface. Thus, they fail to adequately protect the lithium electrode.

Various pre-formed lithium protective layers have been contemplated. For example, U.S. Pat. No. 5,314,765 (issued to Bates on May 24, 1994) describes an ex situ technique for fabricating a lithium electrode containing a thin layer of sputtered lithium phosphorus oxynitride ("LiPON") or related material. LiPON is a glassy single ion conductor (conducts lithium ion) which has been studied as a potential electrolyte for solid state lithium microbatteries that are fabricated on silicon and used to power integrated circuits (See U.S. Pat. Nos. 5,597,660, 5,567,210, 5,338,625, and 5,512,147, all issued to Bates et al.).

In both the in situ and ex situ techniques for fabricating a protected lithium electrode, one must start with a smooth clean source of lithium on which to deposit the protective layer. Unfortunately, most commercially available lithium has a surface roughness that is on the same order as the thickness of the desired protective layer. In other words, the lithium surface has bumps and crevices as large as or nearly as large as the thickness of the protective layer. As a result, most contemplated deposition processes cannot form an adherent gap-free protective layer on the lithium surface.

Thus, lithium battery technology still lacks an effective mechanism for protecting lithium negative electrodes.

SUMMARY OF THE INVENTION

The present invention provides an improved method for forming active metal electrodes having protective layers. Active metals include those metals that can benefit from a protective layer when used as electrodes. The method involves fabricating a lithium or other active metal electrode without depositing the protective layer on a layer of metal. Rather the lithium or other active metal is deposited on the protective layer. A current collector may also be attached to the lithium or active metal during the process.

One aspect of the invention provides a method of fabricating an active metal electrode, which method may be characterized by the following sequence: (a) forming a glassy or amorphous protective layer on a substrate; (b) depositing a first layer of active metal on the protective layer; and (c) providing a current collector on the first layer of active metal. The protective layer forms a substantially impervious layer which is conductive to ions of an active metal. In a preferred embodiment, the active metal is lithium and the protective layer is a single ion conductor which conducts lithium ions.

The substrate may be a sacrificial layer such as a releasable web carrier that includes a layer of copper, tin, zinc, aluminum, iron, etc. on which the protective layer is formed. Alternatively, the substrate may be a battery component such as a solid or gel electrolyte (e.g., a polymer electrolyte). After the electrode/electrolyte laminate is formed, it may be combined with a positive electrode and packaged to form a battery.

Preferably, the protective layer is formed on the substrate by a physical deposition process (e.g., sputtering) or a chemical vapor deposition process (e.g., plasma enhanced chemical vapor deposition). The alkali metal may also be deposited by a physical or chemical vapor deposition process. In one preferred embodiment, the active metal is an alkali metal that is deposited by evaporation.

The method may include affixing a current collector the remainder of the electrode. In one preferred approach, a second layer of the active metal is provided on the current collector (by evaporation for example). Then the current collector together with the second active metal layer is combined with the remainder of the electrode by bonding the second active metal layer to the first active metal layer (which is already affixed to the protective layer).

The invention also pertains to a partially fabricated battery cell which may be characterized by the following features: (a) a current collector; (b) a glassy or amorphous protective layer; (c) an active metal layer provided between the current collector and the protective layer; and (d) a gel or solid electrolyte provided on the protective layer opposite the alkali metal layer. Again, the protective layer forms a substantially impervious layer which is a single ion conductor conductive to ions of the active metal.

In one embodiment, the current collector is a layer of metal such as copper, nickel, stainless steel, and zinc. In another embodiment, the current collector is a metallized plastic sheet.

If the active metal is lithium, the protective layer should be conductive to lithium ions. Examples of suitable lithium ion conducting protective layer materials include lithium silicates, lithium borates, lithium aluminates, lithium phosphates, lithium phosphorus oxynitrides, lithium silicosulfides, lithium borosulfides, lithium aluminosulfides, and lithium phosphosulfides. Specific examples of protective layer materials include $6LiI-Li_3PO_4-P_2S_5$, $B_2O_3-LiCO_3-Li_3PO_4$, $LiI-Li_2O-SiO_2$, and $Li_xPO_yN_z$ (LiPON). Preferably, the protective layer has a thickness of between about 50 angstroms and 5 micrometers (more preferably between about 500 angstroms and 2000 angstroms). Preferably, the protective layer has a conductivity (to an alkali metal ion) of between about $10^{-8}$ and about $10^{-2}$ $(ohm-cm)^{-1}$.

The partially fabricated battery cell will generally be assembled into a completed primary or secondary battery. Examples of suitable primary batteries include lithium manganese dioxide batteries, lithium $(CF)_x$ batteries, lithium thionyl chloride batteries, lithium sulfur dioxide batteries, lithium iron sulfide batteries ($Li/FeS_2$), lithium polyaniline batteries, and lithium iodine batteries. Examples of suitable secondary batteries include lithium-sulfur batteries, lithium cobalt oxide batteries, lithium nickel oxide batteries, lithium manganese oxide batteries, and lithium vanadium oxide batteries. Other batteries employing active metals other than lithium may be employed as well. These include the other alkali metals, alkaline earth metals (e.g., magnesium), and certain transition metals.

These and other features of the invention will be further described and exemplified in the drawings and detailed description below.

DETAILED DESCRIPTION OF THE PREFERRED EMBODIMENTS

Fabrication Methods

In the following description, the invention is presented in terms of certain specific compositions, configurations, and processes to help explain how it may be practiced. The invention is not limited to these specific embodiments. For example, while much of the following discussion focuses on lithium systems, the invention pertains more broadly to other active metal battery systems as well (e.g., batteries having negative electrodes of alkali metals, alkaline earth metals, and certain transition metals).

Figure 1:
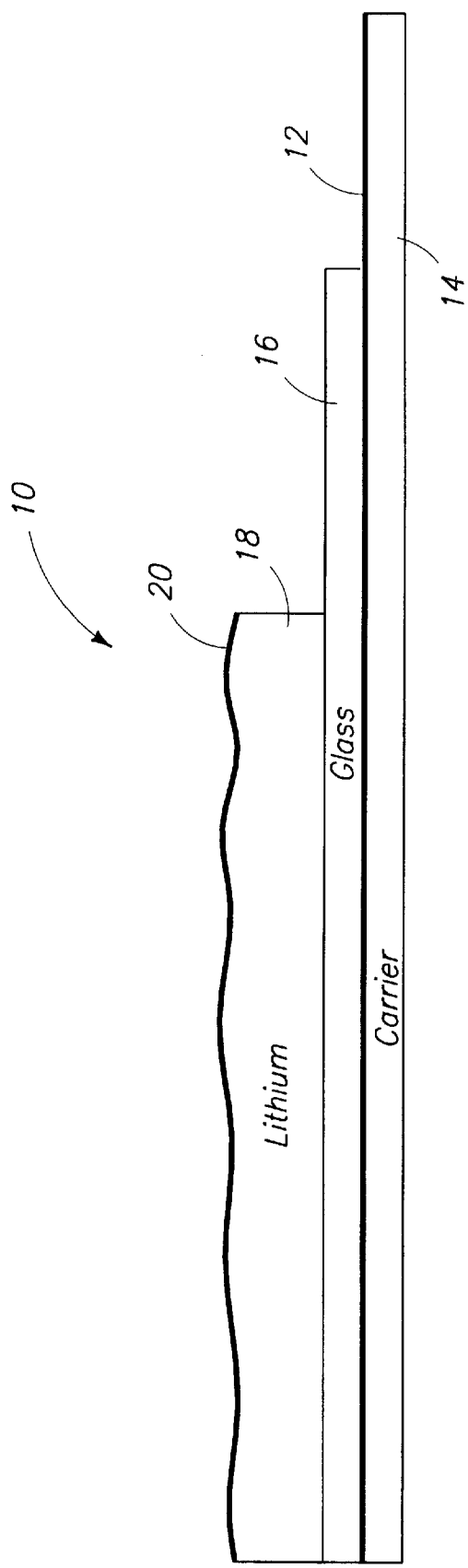
FIG. 1 is a schematic illustration of a lithium electrode being prepared according to a first preferred embodiment of the invention including forming a lithium layer on a pre-formed protective layer.
Figure 2A:
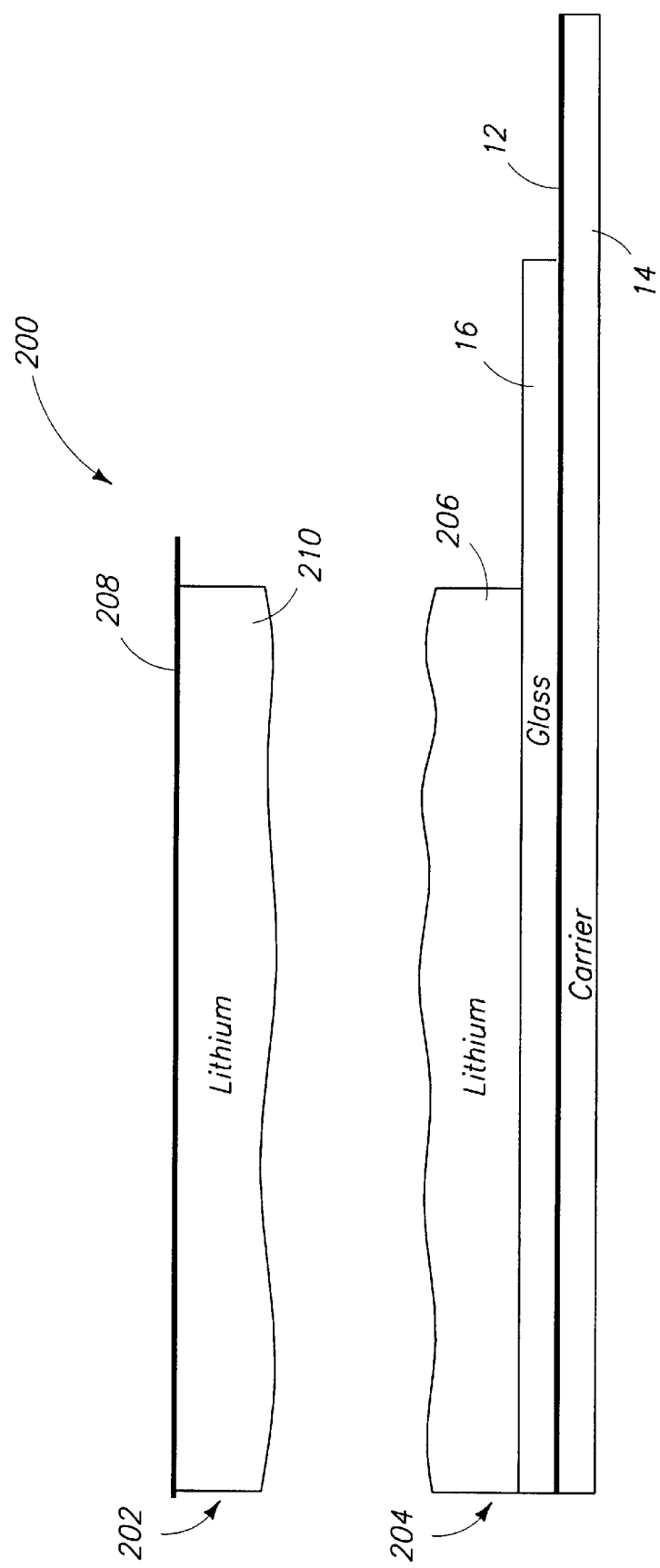
FIG. 2A is a schematic illustration of a lithium electrode being prepared according to a second preferred embodiment of the invention including forming sub-layers of lithium on pre-formed current collectors and protective layers and then bonding the two sub-layers of lithium.
Figure 2B:
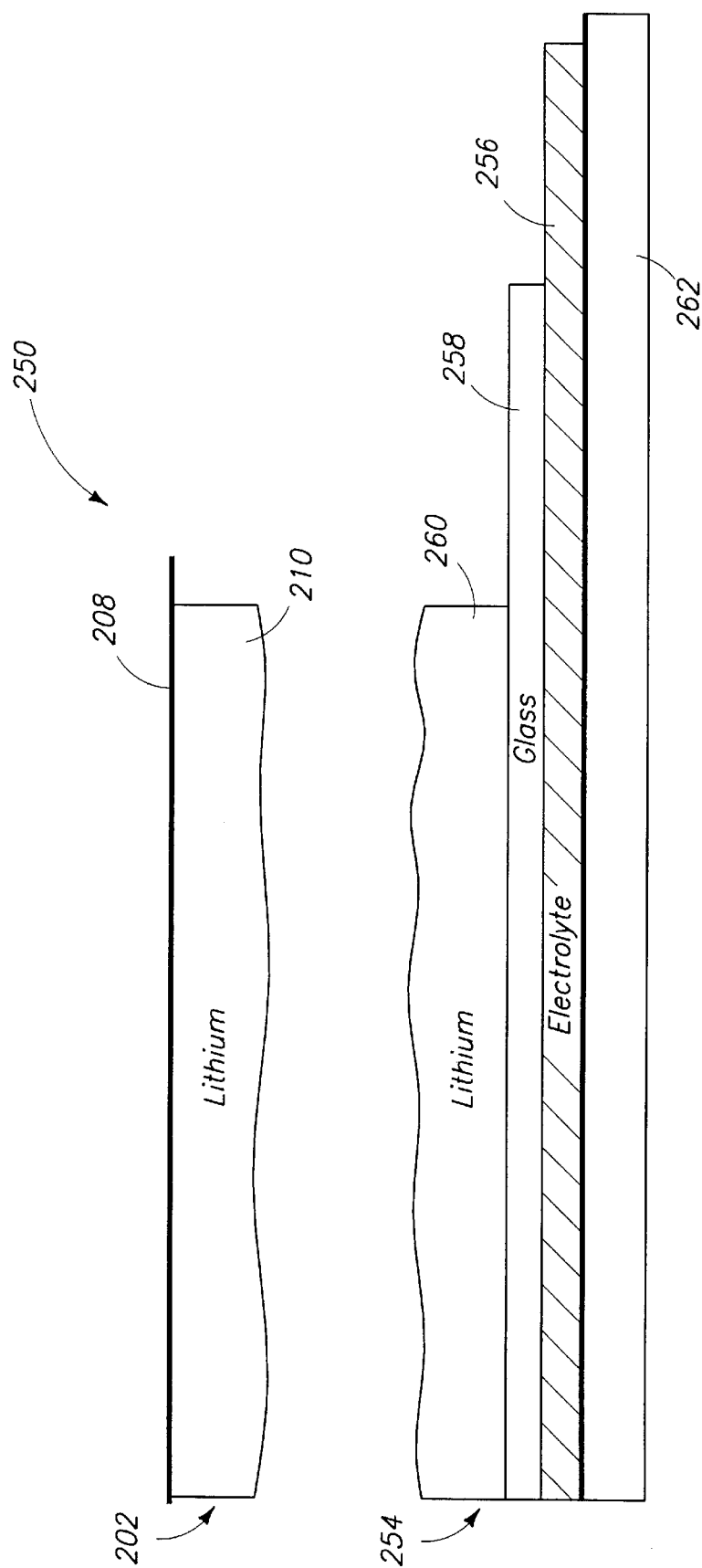
FIG. 2B is a schematic illustration of a lithium electrode being prepared according to a third preferred embodiment of the invention including the lithium sub-layers of the second embodiment, but having the protective layer preformed on an electrolyte layer.

FIGS. 1, 2A, and 2B illustrate three preferred fabrication processes of the present invention. Considering FIG. 1 first, a lithium electrode 10 is fabricated as a laminate in the following manner. Initially, a thin layer of a release agent 12 is deposited on a web carrier 14 by evaporation for example. This web carrier and the release agent should have a surface that is very smooth. Deposition of the release agent is followed by deposition of a glassy or amorphous single ion conductor 16 onto release agent 12 by a suitable process such as sputtering or chemical vapor deposition. Glass layer 16 serves as a protective layer in the completed electrode and is therefore preferably a single ion conductor which conducts ions of the active metal used in the electrode (e.g., lithium). Because protective layer 16 is deposited on a very smooth surface, it too will be smooth and continuous.

Next, after the protective layer is formed, a layer of lithium 18 (or other active metal for the electrode) is deposited on protective glass layer 16 by evaporation for example. Then, a current collector 20 (e.g., a copper layer of about 1000 angstroms to one micrometer thickness) is formed on lithium layer 18 by a conventional process such as evaporation. Finally, the protective layer/lithium layer/current collector laminate is peeled off of the carrier 14, with release layer 12 giving way.

The resulting structure may be referred to as an "encapsulated electrode." Because the lithium is encapsulated within the protective layer and the current collector, it may be transported, stored, and otherwise handled without the precautions normally required for a lithium metal electrode.

Preferably, the entire process is conducted in a continuous fashion and under a vacuum. This ensures a high throughput for manufacturing and clean fresh surfaces for forming each layer of the laminate. The various steps in the process (e.g., forming the release agent, forming the protective layer, forming the lithium layer, and forming the current collector) are performed sequentially at different stages. As the web passes through each successive station a fresh layer is formed thereon.

Because the web carrier supports continuous fabrication of the electrode laminate through a series of deposition reactors, it should withstand high temperatures and wide pressure ranges. Examples of suitable web materials include plastics such as polyethylene terephthalate (PET), polypropylene, polyethylene, polyvinylchloride (PVC), polyolefins, and polyimides. The web carrier should have a thickness and tensile strength suitable for web handling at the line speeds dictated by the metal and glass deposition steps.

The release agent serves to release the subsequently formed electrode from the web carrier. The particular release layer chosen depends upon the types of web carrier and protective layer employed. Suitable release agents are known in the art. In a specific embodiment, the release layer is a 50 angstrom copper film formed by evaporation or sputtering. The release agent should be as thin as possible while still retaining release properties, and easily dissolving in the target battery environments. In the case of a copper release, a thick copper release film could potentially block ionic transport to the glass layer. Therefore a thin Cu layer is envisaged whereby, once in the battery environment, the thin copper layer is removed by corrosion and/or dissolution, exposing the glass layer to the battery electrolyte.

The encapsulated electrode 10 resulting from this process includes a lithium metal layer 18 sandwiched between current collector 20 and protective layer 16. Because the lithium layer is formed after the protective layer (rather than having the protective layer deposited on a potentially rough lithium surface as in conventional processes), the protective layer is of high quality. That is, the protective layer is generally gap-free and adherent when produced according to this invention. As mentioned, it may be difficult to direct sputter deposit glass onto a lithium film due to the high degree of surface roughness of the lithium film relative to the sputter deposited glass film thickness (e.g., 300 to 1500 angstroms).

FIG. 2A illustrates another preferred embodiment of the present invention. In this embodiment, the lithium (or other active metal) is deposited in two portions: a first portion on a pre-formed protective layer and a second portion on a pre-formed current collector. As shown, a partially fabricated lithium electrode 200 includes two primary components: current collector laminate 202 and a protective layer laminate 204. Each of these includes a lithium sub-layer. The two laminates are brought into alignment so that lithium sub-layers on each face one another and can be bonded to form a single lithium layer in a laminate electrode. Assuming that the bonding takes place soon after the lithium sub-layers are formed and the lithium deposition and bonding takes place in a vacuum, the lithium surfaces will be clean and easy to bond.

As shown, protective layer laminate 204 includes a carrier 14, a release agent 12, and a protective layer 16 formed and arranged as described with reference to the first embodiment. In addition, laminate 204 includes a lithium sub-layer 206 that may be formed on protective layer 16 by evaporation for example. Because the lithium is provided as two sub-layers, the thickness of lithium in sub-layer 206 will generally be less than the thickness of lithium in layer 18 of the first embodiment.

Current collector laminate 202 includes a current collector 208 and a lithium sub-layer 210. Current collector 208 is preferably a smooth metal sheet or a metallized plastic sheet. Laminate 204 is formed by depositing lithium on current collector 208 via evaporation or other suitable process. Like sub-layer 206, sub-layer 210 contains only a fraction of the lithium in the final encapsulated electrode. Therefore, it will not be so thick as layer 18 in the first embodiment.

Thus, electrode 200 comprises a stack including a current collector as the bottom layer, a single ion conducting protective layer as the top layer, and a lithium metal layer sandwiched between the current collector and the protective layer.

FIG. 2B illustrates a third preferred embodiment for carrying out the invention. In this embodiment, an encapsulated electrode is again formed from two laminates: a current collector laminate 202 (similar to the arrangement employed in the second embodiment) and an electrolyte laminate 254. As with the second embodiment, each of the two laminates contains a fraction of the electrode's lithium in the form of a lithium "sub-layer." During processing, the two laminates are brought into position so that the two lithium sub-layers face each other and can be bonded.

Electrolyte laminate 254 includes an electrolyte layer 256 which serves as a substrate for deposition of a glass layer 258 by sputtering, chemical vapor deposition, or other suitable process. A lithium sub-layer 260 is deposited on glass layer 258 by evaporation or other suitable process. Electrolyte layer 256 serves as the electrolyte in a subsequently fabricated battery cell. Thus, it should be made from a suitable electrolyte material (e.g., a polymer electrolyte or gelable polymer) for the cell under consideration. Glass layer 258 is a protective layer and is similar to glass layer 16 of the first and second embodiments except that it is formed on an electrolyte substrate rather than a web carrier substrate (carrier 14). In addition, no release agent is required in this embodiment, as the goal is to form a partially fabricated cell that includes both the negative electrode and the electrolyte.

Optionally, the electrolyte laminate 254 includes a carrier web 262 for web handling ease. In some embodiments, electrolyte layer 256 will be very thin (e.g., on the order of 2 microns), and preferably would be releasable from a carrier material (e.g., 10–20 micrometer thick PET). Carrier web 262 may have the properties of carrier 14 in the other embodiments.

The ultimate structure produced by the third process includes an electrolyte layer as a bottom layer, a current collector as the top layer, a lithium metal layer affixed to the current collector, and a protective layer affixed to the electrolyte layer. The protective layer and lithium metal layers are also affixed to one another.

In this third embodiment, there is no need for a release layer and sputtering of sacrificial copper is avoided. The electrolyte layer can be of such a thickness that is easily handled on a web (10 to 20 micrometers thick). Alternatively, the polymer can be very thin supported on a thicker releasable sheet (e.g., 1 micrometer of polymer electrolyte on 12 micrometer PET).

The processes of FIGS. 2A and 2B are preferably conducted in a continuous fashion and under a vacuum. In both cases, a protective layer laminate and a current collector laminate are initially formed and then bonded to form a single encapsulated electrode. The bonding may be accomplished by passing the two laminates through rollers. It is, of course, possible that the two laminates are bonded in a batch process.

Note that in the encapsulated electrodes produced in accordance with all three embodiments, the current collector includes a first surface which is exposed to the ambient and a second surface which intimately contacts the lithium layer. The lithium layer includes a first surface which forms the interface with the current collector and a second surface which intimately contacts the protective layer. In turn, the protective layer includes a first surface which contacts the second surface of the lithium layer and a second surface which is exposed to the ambient. The interfaces at the surfaces of the lithium layer should be sufficiently continuous or intimate that moisture, air, electrolyte, and other agents from the ambient are prevented from contacting the lithium metal. In addition, the interface the lithium and the current collector should provide a low resistance electronic contact. Finally, the interface between the lithium and the protective layer should provide a low resistance ionic contact. In the third embodiment, the final structure is an electrode/electrolyte laminate in which the electrolyte layer is affixed to the outer surface of protective layer where an intimate, low ionic resistance contact is made.

Preferably, the current collectors employed with this invention form a physically rigid layer of material that does not alloy with lithium. They should be electronically conductive and unreactive to moisture, gases in the atmosphere (e.g., oxygen and carbon dioxide), electrolytes and other agents they are likely to encounter prior to, during, and after fabrication of a battery. Examples of materials useful as current collectors for this invention include copper, nickel, many forms of stainless steel, zinc, chromium, and compatible alloys thereof. The current collector should not alloy with, easily migrate into, or otherwise detrimentally effect the electrochemical properties of the lithium layer. This also ensures that the current collector material does not redistribute during the charge and discharge cycles in which lithium is alternately plated and electrolytically consumed. The thickness of the current collector depends upon the material from which it is made. For many embodiments of interest, the current collector is between about 1 and 25 micrometers thick, more preferably between about 6 and 12 micrometers thick.

In an alternative embodiment, the current collector is provided as a metallized plastic layer. In this case, the current collector may be much thinner than a free-standing current collector. For example, the metal layer on plastic may be in the range of 500 angstroms to 1 micrometer in thickness. Suitable plastic backing layers for use with this type of current collector include polyethylene terephthalate (PET), polypropylene, polyethylene, polyvinylchloride (PVC), polyolefins, polyimides, etc. The metal layers put on such plastic substrates are preferably inert to lithium (e.g., they do not alloy with lithium) and may include at least those materials listed above (e.g., copper, nickel, stainless steel, and zinc). One advantage of this design is that it forms a relatively lightweight backing/current collector for the electrode.

In an alternative embodiment, the current collector is coated with a non-electronically conductive outer layer such as a second protective layer. In this embodiment, a current collector or terminal must still be affixed to the lithium electrode. This may take the form of a metal tab or other electronically conductive member that extends beyond the protective layers.

The current collector may be prepared by a conventional technique for producing current collectors. In the second and third embodiments, the current collectors may be provided as sheets of the commercially available metals or metallized plastics. The surfaces of such current collectors may be prepared by standard techniques such as electrode polishing, sanding, grinding, and/or cleaning. At this point, the surface of the current collector should be smoother than the thickness of the protective glass layer subsequently deposited onto it. For example, a current collector with a surface roughness on the order of micrometers might not be suitable for deposition of a 1000 angstrom layer of glass. On the other hand, a current collector with a surface roughness of one micrometer might be suitable for deposition of a five micrometer thick layer of glass.

Alternatively, the current collector metals may be formed by a more exotic technique such as evaporation of the metal onto a substrate, physical or chemical vapor deposition of the metal on a substrate, etc. Such processes may be performed as part of a continuous process for constructing the electrode. Each step in the continuous process would be performed under vacuum.

The protective layer serves to protect the lithium metal in the electrode during cell cycling. It should protect the lithium metal from attack from the electrolyte and reduce formation of dendrites and mossy deposits. In addition, protective layer should be substantially impervious to agents from the ambient. Thus, it should be substantially free of pores, defects, and any pathways allowing air, moisture, electrolyte, and other outside agents to penetrate though it to the metal layer. In this regard, the composition, thickness, and method of fabrication may all be important in imparting the necessary protective properties to the protective layer. These features of the protective layer will be described in further detail below.

Preferably, the protective layer is so impervious to ambient moisture, carbon dioxide, oxygen, etc. that a lithium electrode can be handled under ambient conditions without the need for elaborate dry box conditions as typically employed to process other lithium electrodes. Because the protective layer described herein provides such good protection for the lithium (or other reactive metal), it is contemplated that electrodes and electrode/electrolyte composites of this invention may have a quite long shelf life outside of a battery. Thus, the invention contemplates not only batteries containing a negative electrode, but unused negative electrodes and electrode/electrolyte laminates themselves. Such negative electrodes and electrode/electrolyte laminates may be provided in the form of sheets, rolls, stacks, etc. Ultimately, they are integrated with other battery components to fabricate a battery. The enhanced stability of the batteries of this invention will greatly simplify this fabrication procedure.

The protective layer should be a glass or amorphous material that conducts lithium ion but does not significantly conduct other ions. In other words, it should be a single ion conductor. It should also be stable for the voltage window employed in the cell under consideration. Still further it should be chemically stable to the electrolyte, at least within the voltage window of the cell. Finally, it should have a high ionic conductivity for the lithium ion.

The protective layer may be formed directly on a carrier or electrolyte by any suitable process. It can be deposited on these substrates by techniques such as physical vapor deposition and chemical vapor deposition. In a preferred embodiment, it is deposited by plasma enhanced chemical vapor deposition (PECVD). Examples of suitable physical vapor deposition processes include sputtering and evaporation (e.g., electron-beam evaporation). A PECVD technique is described in U.S. patent application Ser. No. 09/086,665, filed on May 19, 1998, and titled PROTECTIVE COATINGS FOR NEGATIVE ELECTRODES, which was previously incorporated herein by reference.

Most generally, the lithium layer described above can be replaced with any metal, any mixture of metals capable of functioning as a negative electrode. However, the protective layers of this invention will find most use in protecting highly reactive metals such as alkali metals and alkaline earth metals. The thickness of the metal layer used in the electrodes of this invention depends upon the cell construction, the desired cell capacity, the particular metal employed, etc. For many applications, the metal layer thickness will preferably lie between about one and one hundred micrometers.

In one preferred embodiment, the materials for the negative electrodes include a metal such lithium or sodium or an alloy of one of these with one or more additional alkali metals and/or alkaline earth metals. Preferred alloys include lithium aluminum alloys, lithium silicon alloys, lithium tin alloys, and sodium lead alloys (e.g., $Na_4Pb$). Other metallic electrode materials may include alkaline earth metals such as magnesium and their alloys, aluminum, and transition metals such as, zinc, and lead and their alloys. The protective layer must be made from a compatible material. The material should be conductive to ions of the electrochemically active metal or metals in the negative electrode.

If the electrode is formed as a laminate including an electrolyte layer as in the third embodiment, that electrolyte should be a compatible solid state electrolyte or a compatible gelable material. Generally, though not necessarily, the solid state material is a polymeric material. Examples of polymeric electrolytes include polyethers, polyimines, polythioethers, polyphosphazenes, and polymer blends, mixtures, and copolymers thereof in which an appropriate electrolyte salt has optionally been added. Preferred polyethers are polyalkylene oxides, more preferably, polyethylene oxide. It is also possible, that the electrolyte layer is a ceramic or glass such as beta alumina-type materials. Specific examples include sodium beta alumina, Nasicon™ or Lisicon™ glass or ceramic. In one embodiment, the protective layer in the first or second embodiment is made sufficiently thick that it can serve as an electrolyte itself.

If a gelable material is employed, it must be convertible to a gel state electrolyte when mixed with a suitable solvent. Examples of gelable materials include polyacrylonitrile, polyvinylidene difluoride (PVDF), or polyethylene oxide (PEO), can be used.

Protective Layer Composition

The protective layer is preferably composed of a glass or amorphous material that is conductive to metal ions of the negative electrode metal. Preferably, the protective layer does not conduct anions such as $S_8^-$ generated on discharge of a sulfur electrode (or other anions produced with other positive electrodes), or anions present in the electrolyte such as perchlorate ions from dissociation of lithium perchlorate.

In order to provide the needed ionic conductivity, the protective layer typically contains a mobile ion such as a metal cation of the negative electrode metal. Many suitable single ion conductors are known. Among the suitable glasses are those that may be characterized as containing a "modifier" portion and a "network former" portion. The modifier is often an oxide of the active metal in (i.e., the metal ion to which the protective layer is conductive). The network former is often a polymeric oxide or sulfide. One example is the lithium silicate glass 2 $Li_2O$.1 $SiO_2$ and another example is the sodium borosilicate glass 2 $Na_2O$.1 $SiO_2$.2$B_2O_3$.

The modifier/network former glasses employed in this invention may have the general formula $(M_2O)X(A_nD_m)$, where M is an alkali metal, A is boron, aluminum, silicon, or phosphorous, D is oxygen or sulfur. The values of n and m are dependent upon the valence on A. X is a coefficient that varies depending upon the desired properties of the glass. Generally, the conductivity of the glass increases as the value of X decreases. However, if the value of X becomes too small, separate phases of the modifier and network former arise. Generally, the glass should remain of a single phase, so the value of X must be carefully chosen.

The highest concentration of $M_2O$ should be that which yields the stoichiometry of the fully ionic salt of the network former. For instance $SiO_2$ is a polymeric covalent material; as $Li_2O$ is added to silica O—O bonds are broken yielding Si—O $Li^+$. The limit of $Li_2O$ addition is at the completely ionic stoichiometry, which for silica would be $Li_4SiO_4$, or 2$Li_2O$.$SiO_2$ ($Li_2O$.0.5$SiO_2$). Any addition of $Li_2O$ beyond this stoichiometry would necessarily lead to phase separation of $Li_2O$ and $Li_4SiO_4$. Phase separation of a glass composition typically happens well before the fully ionic composition, but this is dependent on the thermal history of the glass and cannot be calculated from stoichiometry. Therefore the ionic limit can be seen as an upper maximum beyond which phase separation will happen regardless of thermal history. The same limitation can be calculated for all network formers, i.e. $Li_3BO_3$ or 3 $Li_2O$.$B_2O_3$, $Li_3AlO_3$ or 3 $Li_2O$.$Al_2O_3$, etc. Obviously, the optimum values of X will vary depending upon the modifier and network former employed.

Examples of the modifier include lithium oxide ($Li_2O$), lithium sulfide ($Li_2S$), lithium selenide ($Li_2Se$), sodium oxide ($Na_2O$), sodium sulfide ($Na_2S$), sodium selenide ($Na_2Se$), potassium oxide ($K_2O$), potassium sulfide ($K_2S$), potassium selenide ($K_2Se$), etc., and combinations thereof. Examples of the network former include silicon dioxide ($SiO_2$), silicon sulfide ($SiS_2$), silicon selenide ($SiSe_2$), boron oxide ($B_2O_3$), boron sulfide ($B_2S_3$), boron selenide ($B_2Se_3$), aluminum oxide ($Al_2O_3$), aluminum sulfide ($Al_2S_3$), aluminum selenide ($Al_2Se_3$), phosphorous pentoxide ($P_2O_5$), phosphorous pentasulfide ($P_2S_5$), phosphorous pentaselenide ($P_2Se_5$), phosphorous tetraoxide ($PO_4$), phosphorous tetrasulfide ($PS_4$), phosphorous tetraselenide ($PSe_4$), and related network formers.

"Doped" versions of the above two-part protective glasses may also be employed. Often the dopant is a simple halide of the ion to which the glass is conductive. Examples include lithium iodide (LiI), lithium chloride (LiCl), lithium bromide (LiBr), sodium iodide (NaI), sodium chloride (NaCl), sodium bromide (NaBr), etc. Such doped glasses may have general formula $(M_2O)X(A_nD_m).Y(MH)$ where Y is a coefficient and MH is a metal halide.

The addition of metal halides to glasses is quite different than the addition of metal oxides or network modifiers to glasses. In the case of network modifier addition, the covalent nature of the glass is reduced with increasing modifier addition and the glass becomes more ionic in nature. The addition of metal halides is understood more in terms of the addition of a salt (MH) to a solvent (the modifier/former glass). The solubility of a metal halide (MH) in a glass will also depend on the thermal history of the glass. In general it has been found that the ionic conductivity of a glass increases with increasing dopant (MH) concentration until the point of phase separation. However, very high concentrations of MH dopant may render the glass hygroscopic and susceptible to attack by residual water in battery electrolytes, therefore it might be desirable to use a graded interface where the halide concentration decreases as a function of distance from the negative electrode surface. One suitable halide doped glass is $Li_2O$ YLiClX$B_2O_3$Z$SiO_2$.

Some other single ion conductor glasses may also be employed as a protective layer used with this invention. One example is a lithium phosphorus oxynitride glass referred to as LiPON which is described in "A Stable Thin-Film Lithium Electrolyte: Lithium Phosphorus Oxynitride," J. Electrochem. Soc., 144, 524 (1997) and is incorporated herein by reference for all purposes. An example composition for LiPON is $Li_{2.9}PO_{3.3}N_{0.5}$. Examples of other glass films that may work include 6LiI—$Li_3PO_4$—$P_2S_5$ and $B_2O_3$—$LiCO_3$—$Li_3PO_4$.

Regarding thickness, protective layer 18 should be as thin as possible while still effectively protecting the metal electrode. Thinner layers have various benefits. Among these are flexibility and low ionic resistance. If a layer becomes too thick, the electrode cannot bend easily without cracking or otherwise damaging the protective layer. Also, the overall resistance of the protective layer is a function of thickness. However, the protective layer should be sufficiently thick to prevent electrolyte or certain aggressive ions from contacting the underlying alkali metal. The appropriate thickness will depend upon the deposition process. If the deposition process produces a high quality protective layer, then a rather thin layer can be employed. A high quality protective layer will be smooth and continuous and free of pores or defects that could provide a pathway for lithium metal or deleterious agents from the electrolyte.

For many protective layers, the optimal thickness will range between about 50 angstroms and 5 micrometers. More preferably, the thickness will range between about 100 angstroms and 3,000 angstroms. Even more preferably, the thickness will range between about 500 angstroms and 2,000 angstroms. For many high quality protective layers, an optimal thickness will be approximately 1000 angstroms.

In addition, the composition of the protective layer should have an inherently high ionic conductivity (e.g., between about $10^{-8}$ and about $10^{-2}$ (ohm–cm)$^{-1}$). Obviously, if a relatively good quality thin layer can be deposited, a material with a relatively low conductivity may be suitable. However, if relatively thicker layers are required to provide adequate protection, it will be imperative that the composition of the protective layer have a relatively high conductivity.

Battery Design

Batteries of this invention may be constructed according to various known processes for assembling cell components and cells. Generally, the invention finds application in any cell configuration. The exact structure will depend primarily upon the intended use of the battery unit. Examples include thin film with porous separator, thin film polymeric laminate, jelly roll (i.e., spirally wound), prismatic, coin cell, etc.

Generally, batteries employing the negative electrodes of this invention will be fabricated with an electrolyte. It is possible, however, that the protective layer could serve as a solid state electrolyte in its own right. If a separate electrolyte is employed, it may be in the liquid, solid (e.g., polymer), or gel state. It may be fabricated together with the negative electrode as a unitary structure (e.g., as a laminate). Such unitary structures will most often employ a solid or gel phase electrolyte.

The negative electrode is spaced from the positive electrode, and both electrodes may be in material contact with an electrolyte separator. Current collectors contact both the positive and negative electrodes in a conventional manner and permit an electrical current to be drawn by an external circuit. In a typical cell, all of the components will be enclosed in an appropriate casing, plastic for example, with only the current collectors extending beyond the casing. Thereby, reactive elements, such as sodium or lithium in the negative electrode, as well as other cell elements are protected.

Figure 3:
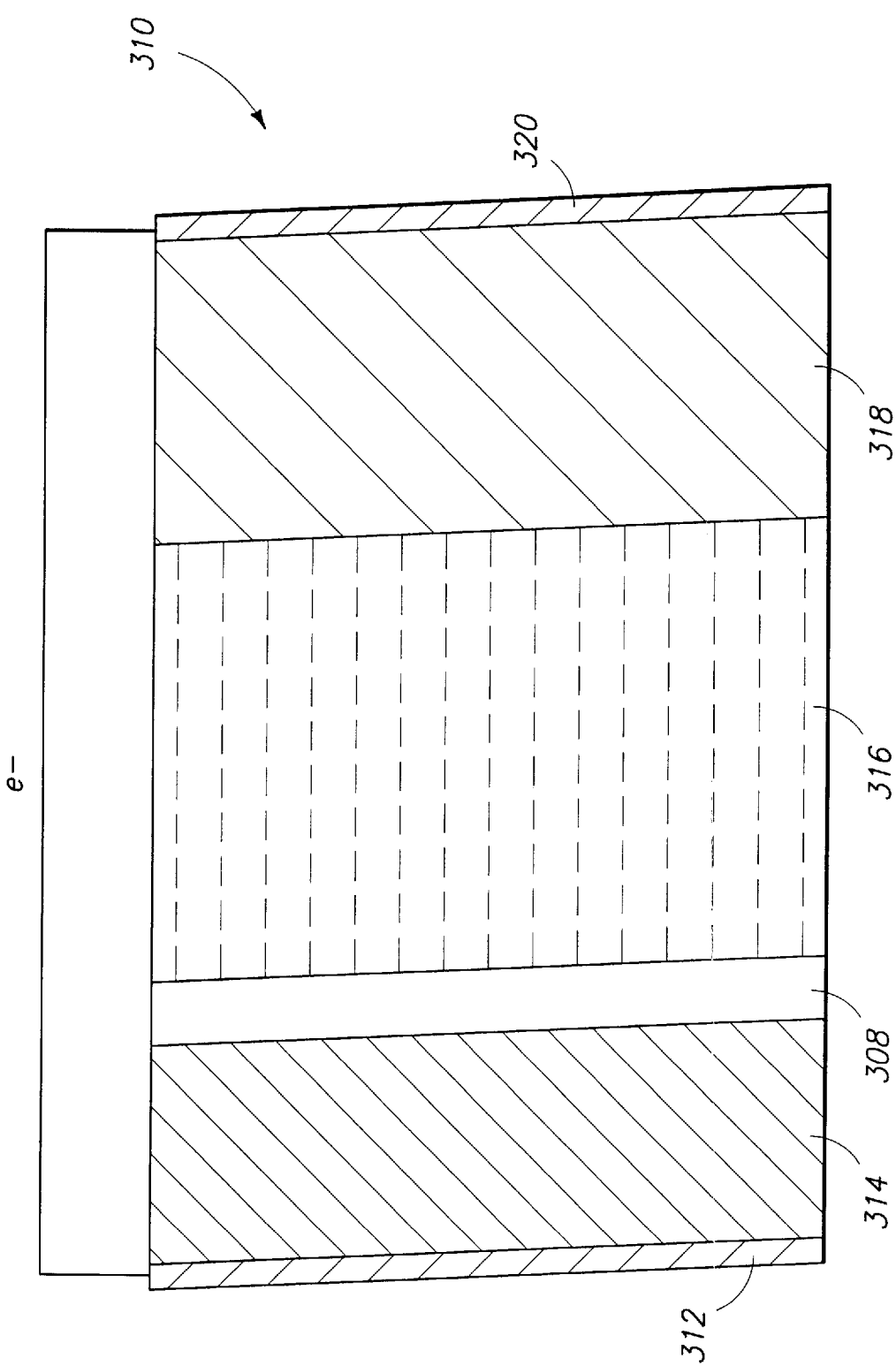
FIG. 3 is a block diagram of a battery formed from an electrode of the present invention.

Referring now to FIG. 3, a cell 310 in accordance with a preferred embodiment of the present invention is shown. Cell 310 includes a negative current collector 312 which is formed of an electronically conductive material. The current collector serves to conduct electrons between a cell terminal (not shown) and a negative electrode 314 (such as lithium) to which current collector 312 is affixed. Negative electrode 314 is made from lithium or other similarly reactive material, and includes a protective layer 308 formed opposite current collector 312. Either negative electrode 314 or protective layer 308 contacts an electrolyte in an electrolyte region 316. As mentioned, the electrolyte may be liquid, gel, or solid (e.g., polymer). To simplify the discussion of FIG. 3, the electrolyte will be referred to as "liquid electrolyte" or just "electrolyte." An example of a solid electrolyte is polyethylene oxide. An example of gel electrode is polyethylene oxide containing a significant quantity of entrained liquid such as an aprotic solvent.

An optional separator in region 316 prevents electronic contact between the positive and negative electrodes. A positive electrode 318 abuts the side of separator layer 316 opposite negative electrode 314. As electrolyte region 316 is an electronic insulator and an ionic conductor, positive electrode 318 is ionically coupled to but electronically insulated from negative electrode 314. Finally, the side of positive electrode 318 opposite electrolyte region 316 is affixed to a positive current collector 320. Current collector 320 provides an electronic connection between a positive cell terminal (not shown) and positive electrode 318.

Current collector 320, which provides the current connection to the positive electrode, should resist degradation in the electrochemical environment of the cell and should remain substantially unchanged during discharge and charge. In one embodiment, the current collectors are sheets of conductive material such as aluminum or stainless steel. The positive electrode may be attached to the current collector by directly forming it on the current collector or by pressing a pre-formed electrode onto the current collector. Positive electrode mixtures formed directly onto current collectors preferably have good adhesion. Positive electrode films can also be cast or pressed onto expanded metal sheets. Alternately, metal leads can be attached to the positive electrode by crimp-sealing, metal spraying, sputtering or other techniques known to those skilled in the art. Some positive electrode can be pressed together with the electrolyte separator sandwiched between the electrodes. In order to provide good electrical conductivity between the positive electrode and a metal container, an electronically conductive matrix of, for example, carbon or aluminum powders or fibers or metal mesh may be used.

A separator may occupy all or some part of electrolyte compartment 316. Preferably, it will be a highly porous/permeable material such as a felt, paper, or microporous plastic film. It should also resist attack by the electrolyte and other cell components under the potentials experienced within the cell. Examples of suitable separators include glass, plastic, ceramic, and porous membranes thereof among other separators known to those in the art. In one specific embodiment, the separator is Celgard 2300 or Celgard 2400 available from Hoechst Celanese of Dallas, Tex.

In an alternative embodiment, no separator is employed. The protective layer on the negative electrode prevents the positive and negative electrodes from contacting one another and serves the function of a separator. In such cases, the protective layer should be tough. It may be relatively thick and made from a material that resists cracking and abrasion.

In some embodiments of the invention, the cell may be characterized as a "thin film" or "thin layer" cell. Such cells possess relatively thin electrodes and electrolyte separators. Preferably, the positive electrode is no thicker than about 300 $\mu$m, more preferably no thicker than about 150 $\mu$m, and most preferably no thicker than about 100 $\mu$m. The negative electrode preferably is no thicker than about 100 $\mu$m and more preferably no thicker than about 100 $\mu$m. Finally, the electrolyte separator (when in a fully assembled cell) is no thicker than about 100 $\mu$m and more preferably no thicker than about 40 $\mu$m.

The present invention can be used with any of a number of battery systems employing a highly reactive negative electrode such as lithium or other alkali metal. For example, any positive electrode used with lithium metal or lithium ion batteries may be employed. These include lithium manganese oxide, lithium cobalt oxide, lithium nickel oxide, lithium vanadium oxide, etc. Mixed oxides of these compounds may also be employed such as lithium cobalt nickel oxide. As will be explained in more detail below, a preferred application of the electrodes of this invention is in lithium-sulfur batteries.

While the above examples are directed to rechargeable batteries, the invention may also find application in primary batteries. Examples of such primary batteries include lithium-manganese oxide batteries, lithium-(CF)$_x$ chloride batteries, lithium sulfur dioxide batteries and lithium iodine batteries. In a particularly preferred embodiment, these primary batteries would be formed in the discharged state; that is, the lithium is plated to the negative electrode in situ. In this embodiment, the primary cells would have extremely long shelf lives because no free lithium is present during the storage and transportation phase.

The protective layer allows one to use a reactive lithium metal electrode in a manner that resembles the use of lithium ion batteries. Lithium ion batteries were developed because they had a longer cycle life and better safety characteristics than metal lithium batteries. The relatively short cycle life of metallic lithium batteries has been due, in part, to the formation of dendrites of lithium which grow from the lithium electrode across the electrolyte and to the positive electrode where they short circuit the cells. Not only do these short circuits prematurely kill the cells, they pose a serious safety risk. The protective layer of this invention prevents formations of dendrites and thereby improves the cycle life and safety of metallic lithium batteries. Further, the batteries of this invention will perform better than lithium ion batteries because they do not require a carbon intercalation matrix to support lithium ions. Because the carbon matrix does not provide a source of electrochemical energy, it simply represents dead weight that reduces a battery's energy density. Because the present invention does not employ a carbon intercalation matrix, it has a higher energy density than a conventional lithium ion cell—while providing better cycle life and safety than metallic lithium batteries studied to date. In addition, the lithium metal batteries of this invention do not have a large irreversible capacity loss associated with the "formation" of lithium ion batteries.

Lithium-Sulfur Batteries

Sulfur positive electrodes and metal-sulfur batteries are described in U.S. Pat. No. 5,686,201 issued to Chu on Nov. 11, 1997 and U.S. patent application Ser. No. 08/948,969 naming Chu et al. as inventors, filed on Oct. 10, 1997. Both of these documents are incorporated by reference for all purposes. The sulfur positive electrodes preferably include in their theoretically fully charged state sulfur and an electronically conductive material. At some state of discharge, the positive electrode will include one or more polysulfides and possibly sulfides, which are polysulfides and sulfides of the metal or metals found in the negative electrode. In some embodiments, the fully charged electrode may also include some amount of such sulfides and/or polysulfides.

The positive electrode is fabricated such that it permits electrons to easily move between the sulfur and the electronically conductive material, and permits ions to move between the electrolyte and the sulfur. Thus, high sulfur utilization is realized, even after many cycles. If the lithium-sulfur battery employs a solid or gel state electrolyte, the positive electrode should include an electronic conductor (e.g., carbon) and an ionic conductor (e.g., polyethylene oxide) in addition to the sulfur electroactive material. If the battery employs a liquid electrolyte, the positive electrode may require only an electronic conductor in addition to the sulfur electroactive material. The electrolyte itself permeates the electrode and acts as the ionic conductor. In the case of a liquid electrolyte cell, the battery design may assume two formats: (1) all active sulfur (elemental sulfur, polysulfides and sulfides of the positive electrode) is dissolved in electrolyte solution (one phase positive electrode) and (2) the active sulfur is distributed between a solid phase (sometimes precipitated) and a liquid phase.

When the metal-sulfur battery cells of this invention include a liquid electrolyte, that electrolyte should keep many or all of sulfur discharge products in solution and therefore available for electrochemical reaction. Thus, they preferably solubilize lithium sulfide and relatively low molecular weight polysulfides. In a particularly preferred embodiment, the electrolyte solvent has repeating ethoxy units ($CH_2CH_2O$). This may be a glyme or related compound. Such solvents are believed to strongly coordinate lithium and thereby increase the solubility of discharge products of lithium-sulfur batteries. Suitable liquid electrolyte solvents are described in more detail in U.S. patent application Ser. No. 08/948,969, previously incorporated by reference.

It should be understood that the electrolyte solvents of this invention may also include cosolvents. Examples of such additional cosolvents include sulfolane, dimethyl sulfone, dialkyl carbonates, tetrahydrofuran (THF), dioxolane, propylene carbonate (PC), ethylene carbonate (EC), dimethyl carbonate (DMC), butyrolactone, N-methylpyrrolidinone, dimethoxyethane (DME or glyme), hexamethylphosphoramide, pyridine, N,N-diethylacetamide, N,N-diethylformamide, dimethylsulfoxide, tetramethylurea, N,N-dimethylacetamide, N,N-dimethylformamide, tributylphosphate, trimethylphosphate, N,N,N',N'-tetraethylsulfamide, tetraethylenediamine, tetramethylpropylenediamine, pentamethyldiethylenetriamine, methanol, ethylene glycol, polyethylene glycol, nitromethane, trifluoroacetic acid, trifluoromethanesulfonic acid, sulfur dioxide, boron trifluoride, and combinations of such liquids.

The protective layers employed in this invention may allow the use of electrolyte solvents that work well with sulfides and polysulfides but may attack lithium. Examples of solvents in this category include amine solvents such as diethyl amine, ethylene diamine, tributyl amine, amides such as dimethyl acetamide and hexamethyl phosphoramide (HMPA), etc.

Exemplary but optional electrolyte salts for the battery cells incorporating the electrolyte solvents of this invention include, for example, lithium trifluoromethanesulfonimide ($LiN(CF_3SO_2)_2$), lithium triflate ($LiCF_3SO_3$), lithium perchlorate ($LiClO_4$), $LiPF_6$, $LiBF_4$, and $LiAsF_6$, as well as corresponding salts depending on the choice of metal for the negative electrode, for example, the corresponding sodium salts. As indicated above, the electrolyte salt is optional for the battery cells of this invention, in that upon discharge of the battery, the metal sulfides or polysulfides formed can act as electrolyte salts, for example, $M_{x/z}S$ wherein x=0 to 2 and z is the valence of the metal.

As mentioned, the battery cells of this invention may include a solid-state electrolyte. An exemplary solid-state electrolyte separator is a ceramic or glass electrolyte separator which contains essentially no liquid. Specific examples of solid-state ceramic electrolyte separators include beta alumina-type materials such as sodium beta alumina, Nasicon™ or Lisicon™ glass or ceramic. Polymeric electrolytes, porous membranes, or combinations thereof are exemplary of a type of electrolyte separator to which an aprotic organic plasticizer liquid can be added according to this invention for the formation of a solid-state electrolyte separator generally containing less than 20% liquid. Suitable polymeric electrolytes include polyethers, polyimines, polythioethers, polyphosphazenes, polymer blends, and the like and mixtures and copolymers thereof in which an appropriate electrolyte salt has optionally been added. Preferred polyethers are polyalkylene oxides, more preferably, polyethylene oxide.

In the gel-state, the electrolyte separator generally contains at least 20% (weight percentage) of an organic liquid (see the above listed liquid electrolytes for examples), with the liquid being immobilized by the inclusion of a gelling agent. Many gelling agents such as polyacrylonitrile, polyvinylidene difluoride (PVDF), or polyethylene oxide (PEO), can be used.

It should be understood that some systems employing liquid electrolytes are commonly referred to as having "polymer" separator membranes. Such systems are considered liquid electrolyte systems within the context of this invention. The membrane separators employed in these systems actually serve to hold liquid electrolyte in small pores by capillary action. Essentially, a porous or microporous network provides a region for entraining liquid electrolyte. Such separators are described in U.S. Pat. No. 3,351,495 assigned to W. R. Grace & Co. and U.S. Pat. Nos. 5,460,904, 5,540,741, and 5,607,485 all assigned to Bellcore, for example. Each of these patents is incorporated herein by reference for all purposes.

The fully charged state of some cells of this invention need not require that the positive electrode be entirely converted to elemental sulfur. It may be possible in some cases to have the positive electrode be a highly oxidized form of lithium polysulfide, for example, as in $Li_2S_x$ where x is five or greater. The fully charged positive electrode may also include a mixture of such polysulfides together with elemental sulfur and possibly even some sulfide. It should be understood that during charge, the positive electrode would generally not be of uniform composition. That is, there will be some amount of sulfide, sulfur, and an assortment of polysulfides with various values of x. Also, while the electrochemically active material includes some substantial fraction of "sulfur," this does not mean that the positive electrode must rely exclusively upon sulfur for its electrochemical energy.

The electronic conductor in the positive electrode preferably forms an interconnected matrix so that there is always a clear current path from the positive current collector to any position in the electronic conductor. This provides high availability of electroactive sites and maintained accessibility to charge carriers over repeated cycling. Often such electronic conductors will be fibrous materials such as a felt or paper. Examples of suitable materials include a carbon paper from Lydall Technical Papers Corporation of Rochester, N.H. and a graphite felt available from Electrosynthesis Company of Lancaster, N.Y.

The sulfur is preferably uniformly dispersed in a composite matrix containing an electronically conductive material. Preferred weight ratios of sulfur to electronic conductor in the sulfur-based positive electrodes of this invention in a fully charged state are at most about 50:1, more preferably at most about 10:1, and most preferably at most about 5:1. The sulfur considered in these ratios includes both precipitated or solid phase sulfur as well as sulfur dissolved in the electrolyte. Preferably, the per weight ratio of electronic conductor to binder is at least about 1:1 and more preferably at least about 2:1.

The composite sulfur-based positive electrode may further optionally include performance enhancing additives such as binders, electrocatalysts (e.g., phthalocyanines, metallocenes, brilliant yellow (Reg. No. 3051-11-4 from Aldrich Catalog Handbook of Fine Chemicals; Aldrich Chemical Company, Inc., 1001 West Saint Paul Avenue, Milwaukee, Wis.) among other electrocatalysts), surfactants, dispersants (for example, to improve the homogeneity of the electrode's ingredients), and protective layer forming additives to protect a lithium negative electrode (e.g., organosulfur compounds, phosphates, iodides, iodine, metal sulfides, nitrides, and fluorides). Preferred binders (1) do not swell in the liquid electrolyte and (2) allow partial but not complete wetting of the sulfur by the liquid electrolyte. Examples of suitable binders include Kynar available from Elf Atochem of Philadelphia, Pa., polytetrafluoroethylene dispersions, and polyethylene oxide (of about 900 k molecular weight for example). Other additives include electroactive organodisulfide compounds employing a disulfide bond in the compound's backbone. Electrochemical energy is generated by reversibly breaking the disulfide bonds in the compound's backbone. During charge, the disulfide bonds are reformed. Examples of organodisulfide compounds suitable for use with this invention are presented in U.S. Pat. Nos. 4,833,048 and 4,917,974 issued to DeJonghe et al. and U.S. Pat. No. 5,162,175 issued to Visco et al.

The battery cells of this invention may be rechargeable "secondary" cells. Unlike primary cells which discharge only once, the secondary cells of this invention cycle between discharge and charge at least two times. Typically, secondary cells of this invention will cycle at least 50 times, with each cycle having a sulfur utilization (measured as a fraction of 1675 mAh/g sulfur output during the discharge phase of the cycle) of at least about 10%. More preferably, at least 50 cycles will have a minimum sulfur utilization of at least about 20% (most preferably at least about 30%). Alternatively, the secondary cells of this invention will cycle at least two times, with each cycle attaining at least 50% utilization of sulfur in the positive electrode.

Other Embodiments

The foregoing describes the instant invention and its presently preferred embodiments. Numerous modifications and variations in the practice of this invention are expected to occur to those skilled in the art. For example, the invention may provide overcharge protection as described in U.S. patent application Ser. No. 08/686,609, filed Jul. 26, 1996, and entitled RECHARGEABLE POSITIVE ELECTRODES and U.S. patent application Ser. No. 08/782,245, filed Mar. 19, 1997, and entitled OVERCHARGE PROTECTION SYSTEMS FOR RECHARGEABLE BATTERIES. Such modifications and variations are encompassed within the following claims.

All references cited herein are incorporated by reference for all purposes.

What is claimed is:

1. A stand-alone active metal negative electrode that is not affixed to a positive electrode, wherein the negative electrode is formed by the following method:
   (a) forming a glassy or amorphous protective layer on a substrate, the protective layer forming a substantially impervious layer which is conductive to ions of an active metal;
   (b) depositing a first active metal layer on the protective layer; and
   (c) providing a current collector on the first active metal layer to form the stand-alone active metal electrode.

2. A battery comprising the active metal electrode of claim 1.

3. The battery of claim 2, wherein the battery is a lithium-sulfur battery.

4. A stand-alone partially fabricated battery cell that does not include a positive electrode, consisting essentially of:
   a current collector;
   a glassy or amorphous protective layer forming a substantially impervious layer which is a single ion conductor conductive to ions of an active metal;

an active metal layer provided between the current collector and the protective layer; and a gel or solid electrolyte provided on the protective layer opposite the active metal layer.

5. The partially fabricated battery cell of claim 4, wherein the current collector is a layer of metal.

6. The partially fabricated battery cell of claim 5, wherein the metal is selected from the group consisting of copper, nickel, stainless steel, and zinc.

7. The partially fabricated battery cell of claim 4, wherein the current collector is a metallized plastic sheet.

8. The partially fabricated battery cell of claim 4, wherein the protective layer is conductive to lithium ions.

9. The partially fabricated battery cell of claim 4, wherein the protective layer includes at least one of a lithium silicate, a lithium borate, a lithium aluminate, a lithium phosphate, a lithium phosphorus oxynitride, a lithium silicosulfide, a lithium borosulfide, a lithium aluminosulfide, and a lithium phosphosulfide.

10. The partially fabricated battery cell of claim 4, wherein the protective layer has a thickness of between about 50 angstroms and 5 micrometers.

11. The partially fabricated battery cell of claim 10, wherein the protective layer has a thickness of between about 500 angstroms and 2000 angstroms.

12. The partially fabricated battery cell of claim 4, wherein the protective layer has a conductivity of between about $10^{-8}$ and about $10^{-2}$ $(ohm-cm)^{-1}$.

13. The partially fabricated battery cell of claim 4, wherein the gel or solid electrolyte comprises a material selected from the group consisting of polyethers, polyimines, polythioethers, polyphosphazenes, and polymer blends, mixtures, and copolymers thereof.

14. The partially fabricated battery cell of claim 4, wherein the gel or solid electrolyte comprises a polyalkylene oxide.

15. A battery cell comprising the partially fabricated battery cell of claim 4.

16. The battery cell of claim 15, wherein the battery cell is a lithium-sulfur battery cell.

* * * * *